(12) United States Patent
Hirose

(10) Patent No.: US 6,837,381 B2
(45) Date of Patent: Jan. 4, 2005

(54) HIGHLY PERMEABLE COMPOSITE REVERSE OSMOSIS MEMBRANE AND METHOD OF PRODUCING THE SAME

(75) Inventor: Masahiko Hirose, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/002,549

(22) Filed: Nov. 2, 2001

(65) Prior Publication Data

US 2002/0060185 A1 May 23, 2002

Related U.S. Application Data

(63) Continuation of application No. 09/452,731, filed on Dec. 1, 1999, now abandoned.

(30) Foreign Application Priority Data

Dec. 21, 1998 (JP) .......................................... 10-363069

(51) Int. Cl.$^7$ ............................................. B01D 71/56
(52) U.S. Cl. ............ 210/490; 210/500.33; 210/500.38; 210/506
(58) Field of Search ........................... 210/490, 500.27, 210/500.33, 500.37, 500.38, 500.39, 506

(56) References Cited

U.S. PATENT DOCUMENTS

| | | | | |
|---|---|---|---|---|
| 3,287,298 A | * | 11/1966 | D'Alelio | |
| 4,353,802 A | * | 10/1982 | Hara et al. | |
| 5,576,057 A | * | 11/1996 | Hirose et al. | |
| 5,674,398 A | * | 10/1997 | Hirose et al. | |
| 5,843,351 A | * | 12/1998 | Hirose et al. | |

OTHER PUBLICATIONS

Encyclopedia of Polymer Science and Technology, 1965, vol. 2, pp. 485–523.*
Encyclopedia of Polymer Science and Engineering, 1985, vol. 2, pp. 324–332.*
Introduction to Industrial Polymers, 2$^{nd}$ edition, 1993, pp. 68 and 69.*

* cited by examiner

*Primary Examiner*—David L. Sorkin
(74) *Attorney, Agent, or Firm*—Osha & May L.L.P.

(57) ABSTRACT

The present invention provides a composite reverse osmosis membrane as a polyamide membrane including a side chain amino group such as a residue of a polyvinyl alcohol-based amine compound represented by Formula 1. Such a membrane can remove organic impurities under a low pressure, providing an economical method for removal of impurities. An aqueous solution including a polyvinyl alcohol-based amine compound having a side chain amino group represented by Formula 1 is applied on a polysulfone-based ultrafiltration membrane as a microporous support. Next, trimesic acid chloride solution is applied causing interfacial polycondensation, which generates a reverse osmosis membrane. When this composite reverse osmosis membrane is evaluated by using a pH 6.5 aqueous solution including 500 mg/l of sodium chloride at an operation pressure of 5 kg/cm$^2$ and at a temperature of 25° C., the permeable flux is at least 1.5 m$^3$/m$^2$·d, and the salt rejection is 80% or less.

Formula 1:

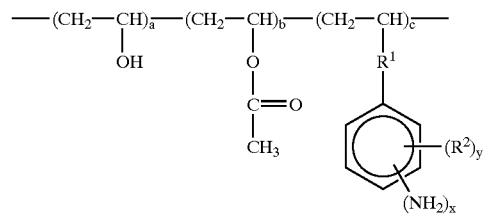

wherein $0<a$, $0 \leq b$, $2<c$, $1 \leq x \leq 5$, $0 \leq y \leq 4$; R$^1$ is at least one group selected from the group consisting of an ether group, an alkylene group and an ester group; and R$^2$ is at least one group selected from the group consisting of an alkyl group and a halogen group.

4 Claims, No Drawings

HIGHLY PERMEABLE COMPOSITE REVERSE OSMOSIS MEMBRANE AND METHOD OF PRODUCING THE SAME

This application is a continuation application of U.S. application Ser. No. 09/452,731 filed Dec. 1, 1999 now abandond.

FIELD OF THE INVENTION

The following disclosure relates to a composite reverse osmosis membrane for selective permeation and separation of ingredients included in a liquid mixture. Specifically, a composite reverse osmosis membrane is used for the removal of toxic substances such as trihalomethane precursors and agricultural chemicals. This is useful for example, in water purification or recovery of effective substances in food production and the like.

BACKGROUND OF THE INVENTION

Conventionally, composite reverse osmosis membranes have been known as reverse osmosis membranes which differ in structure from asymmetric reverse osmosis membranes. Such composite reverse osmosis membranes are produced by forming active thin films having selective separativeness on microporous supports.

Applications disclose membranes comprising polyamide obtainable by interfacial polymerization between polyfunctional aromatic amines and polyfunctional aromatic acid halides formed on supports. The examples of such applications are, Unexamined Published Japanese Patent Application (Tokkai-Sho) 55-147106, Tokkai-Sho 62-121603, Tokkai-Sho 63-218208, and Unexamined Published Japanese Patent Application (Tokkai-Hei) 2-187135.

Inclusion of hydrophilic groups in membranes to improve water permeability is disclosed by, for example, Tokkai-Sho 57-119928, Tokkai-Sho 59-179103, and Tokkai-Sho 62-53703. It is also disclosed that water permeability is further improved by a treatment with an aqueous alkaline solution after including hydrophilic groups in the membrane (see Tokkai-Sho 63-7807 etc.).

Highly hydrophilic polyimide-based reverse osmosis membranes, which include polyvinyl alcohols, are also disclosed in Examined Published Japanese Patent Application (Tokko-Sho) 59-27202, Tokko-Sho 61-17521, Examined Published Japanese Patent Application (Tokko-Hei) 2-32009, Tokkai-Sho 63-17521 and the like.

However, these membranes have a salt rejection factor greater than 90%, and the permeable water quantity is no more than 0.2 m³/m²·d·kg/cm². This indicates that the permeable water quantity level is as low as 0.4 m³/m²·d·kg/cm² at a pressure level of city water (2 kg/cm²). When such membranes are used, the membrane area should be enlarged or pumps should be employed to raise pressure to obtain a proper permeable water quantity. Because these materials reject such a high percentage of salt, salt concentration in the concentrated water is increased at an operation with a high recovery rate, so that insoluble ingredients such as $CaCO_3$ and $SiO_2$ are deposited on the membrane surface and cause troubles such as a decrease in permeable water quantity.

In general, the above-mentioned composite reverse osmosis membranes cannot function sufficiently until they are operated under a pressure of at least 10 kg/cm². This raises costs for facilities and operation. To solve this problem, more improved composite reverse osmosis membranes are required. An ideal membrane would remove toxic substances and maintain economical permeation water level at low pressures. Improvement in the recovery rate (=permeable water quantity/supplied water quantity) can reduce the quantity of supplied water and of condensed water for obtaining a predetermined quantity of permeable water. This results in a smaller apparatus as well as lowering costs for running and treatment of waste water. However, a high recovery rate causes the concentration of insoluble ingredients to rise, causing clogging of the surface. A membrane, which retards deposition of insoluble ingredients even in a high recovery rate of no less than 80%, is required.

SUMMARY OF THE INVENTION

This application discloses a composite reverse osmosis membrane that can remove organic matters even in an operation under a low operation pressure (e.g., 3 kg/cm²). The membrane also provides an economical permeable water level, while preventing deposition of insoluble materials even for high recovery rates.

This composite reverse osmosis membrane comprises a thin film and a microporous support to support the film. The thin film is formed by reacting (a) an amine component comprising at least one polyvinyl alcohol-based amine compound having at least two primary and secondary side chain amino groups; and (b) a component comprising at least one substantially monomeric compound having at least two groups to react with the amino groups.

Most preferably the (a) amine component is represented by the following Formula 3:

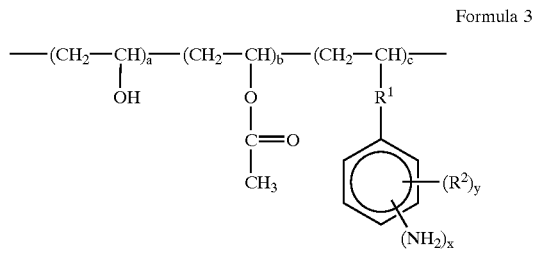

Formula 3 wherein $0<a$, $0\leq b$, $2<c$, $1\leq x \leq 5$, $0\leq y \leq 4$; $R^1$ is at least one group selected from the group consisting of an ether group, an alkylene group and an ester group; and $R^2$ is at least one group selected from the group consisting of an alkyl group and a halogen group.

The amine component can also include at least one amine compound selected from the group consisting of aromatic, aliphatic and alicyclic polyfunctional amines together with the (a) amine compound.

It is preferable that the (b) compound is an acid halide.

Preferably, the (b) compound is at least one polyfunctional acid halide compound selected from the group consisting of aromatic, aliphatic, and alicyclic polyfunctional acid halide compounds.

Preferably, the microporous support is an ultrafiltration membrane on which pores of 1–50 nm in diameter are formed.

Preferably, the composite reverse osmosis membrane has a permeable flux of at least 1.0 $m^3/m^2 \cdot d$ in an evaluation using a pH 6.5 aqueous solution comprising 500 mg/liter of sodium chloride at a pressure of 5 $kg/cm^2$ and at a temperature of 25° C.

Preferably, the salt rejection of said membrane is no more than 80% in an evaluation using a pH 6.5 aqueous solution comprising 500 mg/liter of sodium chloride at a pressure of 5 $kg/cm^2$ and at a temperature of 25° C.

A method of producing such a highly permeable composite reverse osmosis membrane includes contacting on a microporous support (a) a polar solvent solution with (b) at least one organic solvent solution, in order to carry out an interfacial polymerization reaction. The (a) polar solvent solution comprises at least one polyvinyl alcohol-based amine compound having at least two primary and secondary side chain amino groups while the (b) organic solvent solution is selected from the group consisting of compounds of substantial monomers having at least two groups that react with the amino groups. Preferably, the (a) group is the one shown in Formula 3.

DETAILED DESCRIPTION

In this example, at least one amine compound is used for producing thin films. The amine compound is selected from polyvinyl alcohol-based amine compounds having at least two primary and secondary side chain amino groups. When an acid halide group reacts with the amine compound, a polyamide membrane is obtained by an interfacial polycondensation.

Additionally, aromatic, aliphatic and alicyclic polyfunctional amines can be used together with these amine compounds.

Such aromatic polyfunctional amine compounds include, for example, m-phenylenediamine, p-phenylenediamine, 1,3,5-triaminobenzene, 1,2,4,-triaminobenzene, 3,5-diamino benzoic acid, 2,6-diaminotoluene, 2,4-diaminoanisole, and xylenediamine.

The aliphatic polyfunctional amines include, for example, ethylenediamine, propylenediamine, and tris(2-aminoethyl) amine.

The alicyclic polyfunctional amines include, for example, 1,3-diaminocyclohexane, 1,2-diaminocyclohexane, 1,4-diaminocyclohexane, piperazine, 2,5-dimethylpiperazine, and 4-aminomethylpiperazine.

Accordingly, groups that can react with an amino group including at least one compound can be selected from the group consisting of substantially monomeric compounds having at least two groups that can react with amino groups comprise, for example, an acid halide group, an isocyanate group, and a carboxylic acid group. An acid halide group is preferred in light of the reactivity. Specifically, an acid chloride group is preferred.

Polyfunctional acid halide groups that can be used include, but are not limited to aromatic, aliphatic and alicyclic polyfunctional acid halides can be used.

Examples of the aromatic polyfunctional acid halides utilized include trimesic acid chloride, terephthalic acid chloride, isophthalic acid chloride, biphenyldicarboxylic acid chloride, naphthalenedicarboxylic acid chloride, benzene trisulfonic acid chloride, benzene disulfonic acid chloride, and chlorosulfonium benzene dicarboxylic acid chloride.

Examples of the aliphatic polyfunctional acid halides include propanetricarboxylic acid chloride, butanetricarboxylic acid chloride, pentanetricarboxylic acid chloride, glutaryl halide, and adipoyl halide.

Examples of the alicyclic polyfunctional acid halides include cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride.

According to this disclosure, a composite reverse osmosis membrane having a thin film comprising a crosslinked polymer as the main component on a microporous support is obtained by interfacial polymerization of the above-described amine component and a component that can react with the amine component.

Typically, interfacial polymerization involves an interfacial reaction between a polar solution containing an amine component with an organic solution containing a suitable compound. The compound has a group that can react with the amine component on the interface.

It is preferable that the permeable flux is at least 1.5 $m^3/m^2 \cdot d$ when the composite reverse osmosis membrane is evaluated by using a pH 6.5 aqueous solution including 500 mg/l of sodium chloride at an operation pressure of 5 $kg/cm^2$ and at a temperature of 25° C. When the permeable flux is less than 1.0 $m^3/m^2 \cdot d$, sufficient permeable flux cannot be obtained when the operation pressure is as low as 3 $kg/cm^2$ (city water level). For this purpose, more preferable permeable flux is 1.5 $m^3/m^2 \cdot d$ or more.

The salt rejection is preferably 80% or less when the composite reverse osmosis membrane is evaluated by using a pH 6.5 aqueous solution including 500 mg/l of sodium chloride at an operation pressure of 5 $kg/cm^2$ and at a temperature of 25° C. When the salt rejection exceeds 80%, insoluble ingredients are easily deposited under a high recovery condition, and the surface of the reverse osmosis membrane is easily polluted and clogged. It is further preferable that the salt rejection is no more than 70%.

A microporous support used according to this disclosure is not specifically limited as long as it can support the thin film. Typically, an ultrafiltration membrane having pores of 1–50 nm in diameter on the surface is used. Materials for such a support include, for example, polysulfone, polyethersulfone, polyimide, polyamide, polyvinylidene fluoride, ethylene-vinylalcohol copolymer, and cellulose acetate. Ultrafiltration membranes comprising polysulfone, polyethersulfone and the like are specifically preferred in light of the chemical, mechanical and thermal stability. Such an ultrafiltration membrane can be reinforced with woven fabric, non-woven fabric and the like.

The amine salts described in Tokkai-Hei 2-187135, such as a salt of a tetraalkylammonium halide or a trialkylamine, and an organic acid can also be suitably used for the solution to facilitate the film formation, improve the absorption of the amine solution in the support film, and accelerate the condensation reaction.

Addition of a material whose solubility parameter ranges from 8 to 14 $(cal/cm^3)^{1/2}$ for the crosslinking reaction is also effective to increase the permeable water quantity.

The solution can further contain a surfactant such as sodium dodecylbenzenesulfonate, sodium dodecylsulfonate, and sodium laurylsulfonate. Such a surfactant has an effect for improving the wettability of the polar solvent solution including the amine component for the microporous support. Furthermore, for accelerating the polycondensation reaction at the interface, it is effective to use sodium hydroxide or sodium tertiary phosphate capable of removing a hydrogen halide formed by the interfacial reaction or to use an acylation catalyst as a catalyst.

The concentration of the amine compound is not particularly limited to the solution including the amine component described above, but the concentration is usually from 0.01 to 20 weight %, and preferably from 0.1 to 10 weight %.

Any polar solvent can be used for the polar solvent solution including amine component as long as the solvent dissolves the amine component well without dissolving the microporous support. For example, water can be used for this purpose.

The concentration of the amine-reactive compound in an organic solvent is not specifically limited, but typically, it ranges from 0.001 to 10 weight %, preferably, from 0.01 to 5 weight %.

Any organic solvent solutions containing acid halide components are allowable as long as they dissolve the acid halide component while remaining immiscible with the polar solvent. For example, aliphatic or alicyclic hydrocarbons having 5–10 carbons can be used. More specifically, pentane, hexane, heptane, octane, and cyclopentane etc. can be used.

A thin film is formed by applying the polar solution onto a microporous support and by removing excess solution. To this, the organic solution containing an acid halide component is added, and excess solution is removed, so that interfacial polymerization is performed.

Heating can be carried out as required. The heating temperature ranges from 40 to 180° C., preferably, from 50 to 150° C. The heating time ranges from 10 seconds to 60 minutes, more preferably, 1 to 30 minutes.

The method is further described by referring to Examples 1–4, but the disclosure is not limited thereby.

In the following examples a polysulfone-based ultrafiltration membrane was used for the microporous support. The performance of the obtained composite reverse osmosis membrane was evaluated with respect to the sodium chloride rejection and permeable flux after passing through the membrane a pH 6.5 aqueous solution including 500 mg/l of sodium chloride for one hour at an operation pressure of 5 $kgf/cm^2$, and at a temperature of 25° C. The rejection was obtained in a common measurement depending on the electric conductivity.

EXAMPLE 1

An aqueous solution including 2 weight % of polyvinyl alcohol-based amine compound having a side chain amino group represented by Formula 4, 0.5 weight % of sodium lauryl sulfate and 0.5 weight % of sodium hydroxide was applied on a polysulfone-based ultrafiltration membrane (microporous support) before removing extra aqueous solution, so that a layer of the aqueous solution was formed on the support:

Formula 4

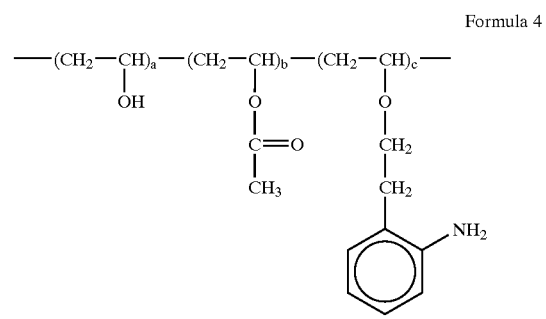

wherein a=8, b=10 and c=500.

Subsequently, the layer was contacted with an isooctane solution including 1 weight % of trimesic acid chloride for interfacial polycondensation on the support, and maintaining for three minutes in a 120° C. dryer so that a polymer membrane was formed on the microporous support, generating a composite reverse osmosis membrane.

The product was then evaluated. The salt rejection was 50%, and the permeable flux was 3.2 $m^3/m^2 \cdot d$. When the performance was evaluated again under the same condition after passing pH 12 alkaline solution through this membrane for three days, the salt rejection was 48% and the permeable flux was 3.3 $m^3/m^2 \cdot d$. This illustrated that the membrane had sufficient resistance against alkali.

EXAMPLES 2–4

Composite reverse osmosis membranes were formed in the same manner as described in Example 1 except that the concentration of the trimesic acid chloride was varied. The performance of the obtained composite reverse osmosis membranes is shown in Table 1.

TABLE 1

| | Trimesic acid chloride concentration (wt %) | Salt rejection (%) | Permeable flux $(m^3/m^2 \cdot d)$ |
|---|---|---|---|
| Example 2 | 0.1 | 34 | 3.7 |
| Example 3 | 0.25 | 50 | 2.5 |
| Example 4 | 3 | 38 | 5.3 |

As shown in Table 1, products of the present invention provide high permeable flux under a low pressure of 5 $kg/cm^2$. Moreover, sufficiently high permeable flux was obtained even under an operation pressure of 3 $kg/cm^2$ (city water level).

Comparative Example 1

A composite reverse osmosis membrane was obtained in a manner similar to Example 1 except that the polyvinyl alcohol-based amine compound was replaced by m-phenylenediamine. When the composite reverse osmosis membrane was evaluated, the salt rejection was 99% and the permeable flux was extremely low as 0.05 $m^3/m^2 \cdot d$.

This disclosure also provides a method of efficiently producing a composite reverse osmosis membrane with the aforementioned desired properties.

The inventions disclosed herein may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A highly permeable composite reverse osmosis membrane comprising:
    a thin film containing an amide group directly connected to an aromatic ring and a microporous support to support the thin film;
    wherein the thin film is formed through an interfacial polymerization by reacting a polyvinyl alcohol-based aromatic amine compound having at least two amino groups with at least one substantially monomeric compound having at least two groups that react with the at least two amino groups on the polyvinyl alcohol-based aromatic amine compound, and
    wherein the highly permeable composite reverse osmosis membrane having a salt rejection of no less than 34% and no more than 80%, and a permeable flux of no less than 1.0 $m^3/m^2 \cdot d$ as assessed with a pH 6.5 aqueous solution comprising 500 mg/liter of sodium chloride at an operation pressure of 5 $kg/cm^2$ and at a temperature of 25° C.

2. The highly permeable composite reverse osmosis membrane according to claim 1, wherein the at least one substantially monomeric compound is an acid chloride.

3. The highly permeable composite reverse osmosis membrane according to claim 1, wherein the at least one substantially monomeric compound is at least one polyfunctional acid halide compound selected from the group consisting of aromatic, aliphatic, and alicyclic polyfunctional acid halide compounds.

4. The highly permeable composite reverse osmosis membrane according to claim 1, wherein the permeable flux is no more than 5.3 $m^3/m^2 \cdot d$.

* * * * *